US007360200B2

(12) United States Patent
Boucher (10) Patent No.: US 7,360,200 B2
(45) Date of Patent: *Apr. 15, 2008

(54) METHODS AND SYSTEMS FOR SOFTWARE WATCHDOG SUPPORT

(75) Inventor: Michael Boucher, Lafayette, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/278,469

(22) Filed: Apr. 3, 2006

(65) Prior Publication Data

US 2006/0184842 A1  Aug. 17, 2006

Related U.S. Application Data

(63) Continuation of application No. 10/241,097, filed on Sep. 11, 2002, now Pat. No. 7,069,543.

(51) Int. Cl.
*G06F 9/44* (2006.01)
*G06F 9/45* (2006.01)

(52) U.S. Cl. ........................ 717/100; 717/127; 717/129

(58) Field of Classification Search ................ 717/100, 717/124–129, 145–150
See application file for complete search history.

(56) References Cited

U.S. PATENT DOCUMENTS 6,647,546 B1 * 11/2003 Hinker et al. ................ 717/137
6,651,121 B1 * 11/2003 Zurawski et al. ............ 710/100
6,757,888 B1 *  6/2004 Knutson et al. ............. 717/109
6,941,545 B1 *  9/2005 Reese et al. ................. 717/130
6,952,760 B2 * 10/2005 Boucher et al. ............. 711/170
6,954,923 B1 * 10/2005 Yates et al. .................. 717/130
6,957,208 B1 * 10/2005 Boucher et al. ............. 706/55
6,961,922 B1 * 11/2005 Knutson ...................... 717/109
6,964,036 B2 * 11/2005 Bates et al. .................. 717/125
7,000,223 B1 *  2/2006 Knutson et al. ............. 717/121
7,065,634 B2 *  6/2006 Lewis et al. ................. 712/227
7,069,543 B2 *  6/2006 Boucher ...................... 717/127

OTHER PUBLICATIONS

Chern et al, "Debugging with control flow breakpoints", ACM AOSD, pp. 96-106, 2007.*
Yang et al, "The notification based approach to implementing failure detectors in distributed systems", ACM INFOSCALE, pp. 1-10, 2006.*
Maquelin et al, "Polling watchdog: combining polling and interrupts for message handling", ACM ISCA pp. 179-188, 1996.*

* cited by examiner

*Primary Examiner*—Anil Khatri
(74) *Attorney, Agent, or Firm*—Sonnenschein Nath & Rosenthal LLP (57) ABSTRACT

Methods and systems consistent with the present invention allow a program designer to conveniently specify and support watchdog checking of a program under development. The resulting programs are more robust than programs developed without watchdog support. The method and systems provide a convenient, automated mechanism for adding watchdog support to a program. Thus, a developer need not incur the substantial time and effort costs that would be associated with manually designing and configuring separate watchdog programs. Rather, the methods and systems provide substantial assistance to the developer in designing a robust program.

4 Claims, 6 Drawing Sheets

Figure 1

```
#pragma watch(abort, hang, call=cleanup, max_heatbeats=20,
event_handle=handle)                                        202
while (ptr->next != NULL)
{
  ptr = ptr -> next;                   204
  func(ptr);
} event_handle = wd_start_watchdog(watchdog_struct);
while (ptr->next != NULL)
{                                                           210
  wd_report_progress(event_handle);
  ptr = ptr -> next;
  func(ptr);
}                                       214
wd_done(event_handle);
                        216
                                                            206
#pragma watch(hang, signal=9, heart_rate=100, event_handle=handle)
{
  get(message);
  modulate(message, carrier, modulationtype);
  transmit(carrier);                           208
} event_handle = wd_start_watchdog(watchdog_struct);
{
get(message);
wd_report_progress(event_handle);                           212
modulate(message, carrier, modulationtype);
wd_report_progress(event_handle);
transmit(carrier);
wd_report_progress(event_handle);
}                                  218
wd_done(event_handle);
                        220
```

Figure 8

METHODS AND SYSTEMS FOR SOFTWARE WATCHDOG SUPPORT

CROSS REFERENCE

This application is a continuation of U.S. application Ser. No. 10/241,097 filed Sep. 11, 2002 now U.S. Pat. No. 7,069,543. This application claims priority to the foregoing application, which application is incorporated herein by reference to the extent permitted by law.

FIELD OF THE INVENTION

This invention relates to fault detection and recovery in software systems. In particular, this invention relates to adding watchdog support to program code and to a supporting software library of watchdog routines.

BACKGROUND OF THE INVENTION

Certain computer systems need to provide service to customers even in the face of arbitrary combinations of hardware and software failures. Of course, there are some combinations of failures that can disable even the most robust system regardless of the reliability measures that are incorporated into the system. Nevertheless, systems that must be highly available can benefit from a design and implementation that provides for some robustness, for example, through failure detection or recovery.

Designing robust systems can be a difficult task, particularly when complex software (e.g., operating systems and customer applications) interacts with complex hardware. Software tools that assist with creating a robust program are generally cumbersome to use and require significant manual intervention by the designer. As a result, the software tools are not used, and the resulting software is not as robust as it otherwise could be.

Therefore, a need has long existed for fault monitoring, detection, and recovery functionality that overcomes the problems noted above and others previously experienced.

SUMMARY OF THE INVENTION

Methods and systems consistent with the present invention provide a mechanism for conveniently specifying and supporting watchdog checking of a program under development. The methods and systems thus allow a developer to add watchdogs to a program under development without expending an inordinate amount of time and effort. As a result, the programs under development become more robust than programs developed without watchdog support.

According to one aspect of the present invention, such methods and systems, as embodied and broadly described herein, include reading a watchdog specification for a code block, and inserting into the code block a watchdog setup call and a watchdog reporting call. As a result, the developer may insert watchdog specifications at any desired code blocks in the program and allow the compiler, in an automated fashion, to handle the detailed implementation and support of the specified watchdog. Thus, the methods and systems assist the developer in making the program more robust.

Methods and systems consistent with the present invention overcome the shortcomings of the related art, for example, by providing a convenient, automated mechanism for adding watchdog support to a program. Thus, a developer need not incur the substantial time and effort costs that would be associated with manually designing and configuring separate watchdog programs. Rather, methods and systems consistent with the present invention provide substantial assistance to the developer in designing a robust program.

In accordance with methods consistent with the present invention, a method is provided for adding watchdog support to a program. The method includes reading a watchdog specification for a code block, inserting a watchdog setup call into the program before the code block, and inserting a watchdog reporting call into the code block.

In accordance with systems consistent with the present invention, a data processing system is provided. The data processing system includes a memory comprising a compiler, the compiler reading a watchdog specification for a code block, inserting a watchdog setup call into the program before the code block, and inserting a watchdog reporting call into the code block. The data processing system also includes a processor that runs the compiler.

In addition, a computer-readable medium is provided. The computer-readable medium contains instructions that cause a data processing system to perform a method for adding watchdog support to a program comprising code blocks. The method includes reading a watchdog specification for a code block, inserting a watchdog setup call into the program before the code block, and inserting a watchdog reporting call into the code block.

Other apparatus, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying drawings.

BRIEF DESCRIPTION OF THE DRAWINGS

FIG. 2 depicts an example of watchdog specifiers and code blocks present in source code stored in the memory of the data processing system shown in FIG. 1, as well as watchdog support instructions added by a compiler running in the memory of the data processing system shown in FIG. 1.

DETAILED DESCRIPTION OF THE INVENTION

Reference will now be made in detail to an implementation in accordance with methods, systems, and products consistent with the present invention as illustrated in the accompanying drawings. The same reference numbers may be used throughout the drawings and the following description to refer to the same or like parts.

Figure 1:
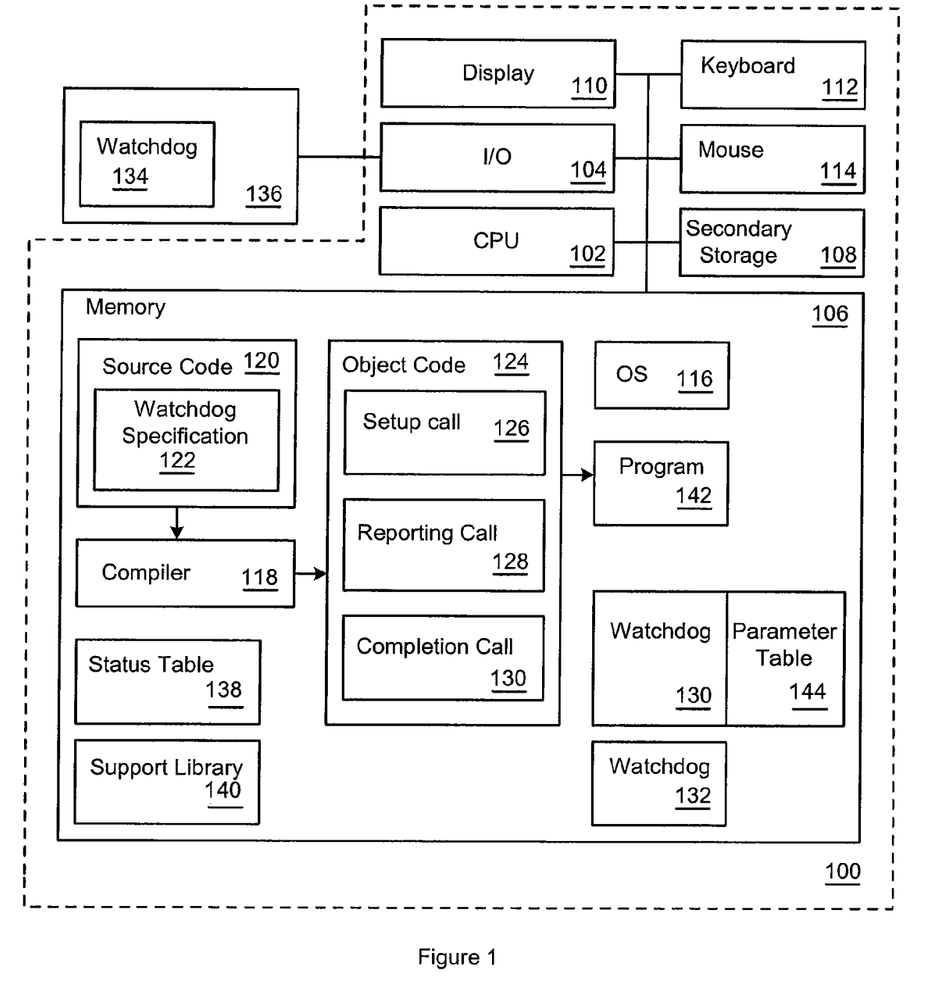
FIG. 1 depicts a block diagram of a data processing system suitable for practicing methods and implementing systems consistent with the present invention.

FIG. 1 depicts a block diagram of a data processing system 100 suitable for practicing methods and implementing systems consistent with the present invention. The data processing system 100 comprises a central processing unit (CPU) 102, an input output I/O unit 104, a memory 106, a secondary storage device 108, and a video display 110. The data processing system 100 may further include input devices such as a keyboard 112, a mouse 114 or a speech processor (not illustrated).

An operating system 116 (e.g., UNIX, Solaris, or the like) runs in the memory 106. A compiler 118 is available to program developers and may be invoked to compile the source code 120. In one embodiment, the compiler 118 reads watchdog specifications 122 in the source code 120 and responsively adds watchdog functionality when forming the program object code 124 (and thus the resultant executable 142). The compiler 118 may add, as examples, watchdog setup calls 126, watchdog reporting calls 128, and watchdog completion calls 130 to the object code 124.

The watchdog setup calls 126 are responsible in part for initiating execution of subroutines to establish the watchdogs 130, 132, and 134. The watchdog 130 is a watchdog thread that watches over code blocks associated with a thread-level threat. The watchdog 132 is a watchdog program that watches over code blocks associated with a program-level threat. The watchdog 134 is a watchdog program whose execution is initiated on a separate data processing system 136 to monitor code block execution on the data processing system 102 that pose a machine-level threat to the data processing 102. The threat levels are discussed in more detail below.

In general, a watchdog is a piece of code inserted by the compiler that monitors execution of a code block to detect execution abnormality of either the software or the hardware or software. For example, the watchdog may detect when a program code block hangs, enters an infinite loop, or causes the program to abnormally terminate.

The memory 106 also holds a watchdog status table 138. The status table 138 stores parameters relevant to the execution of the watchdogs 130-134. The data processing system 136 (which may be implemented in the same manner as the data processing system 100) may store its own watchdog status table 138. As will be explained in more detail below, the watchdogs 130-134 operate according to the parameters provided for them in the watchdog status table 138 and in a local parameter table 144 associated with each watchdog 130-134. The watchdog support library 140 provides the functions that implement the watchdog setup calls 126, watchdog reporting calls 128, watchdog completion calls 130, and additional watchdog support calls discussed below.

Although aspects of the present invention are depicted as being stored in memory 106, one skilled in the art will appreciate that all or part of systems and methods consistent with the present invention may be stored on or read from other computer-readable media, for example, secondary storage devices such as hard disks, floppy disks, and CD-ROMs; a signal received from a network such as the Internet; or other forms of ROM or RAM either currently known or later developed. Further, although specific components of data processing system 100 are described, one skilled in the art will appreciate that a data processing system suitable for use with methods, systems, and articles of manufacture consistent with the present invention may contain additional or different components.

The watchdog specifications 122 are associated with code blocks in the source code 120. A code block is one or more source code statements in the source code 120. As examples, the code block for a loop generally includes all the statements forming the loop (with the watchdog specification placed immediately before the loop), while a code block for sequential statements may be bounded using braces ('{', '}') (or other pre-selected characters). FIG. 2 shows an example of a watchdog specifier 202 associated with a "while" loop code block 204 and an example of a watchdog specifier 206 associated with a non-loop code block 208 (bounded using braces).

In one implementation, as shown in FIG. 2, the watchdog specifications 202 and 206 take the form of "pragma" statements read and interpreted by the compiler 118 with the form shown below in Table 1:

TABLE 1 pragma watch(condition_list, signal=signum | call=userfunc [,max_heartbeats=nn] [,heart_rate=nn] [,event_handle=variable] [,userlib=path_to_shared_library_containing_user_code]).

| Parameter | Comment |
| --- | --- |
| condition_list | This parameter provides a list of events for which the watchdog should watch. It can be a comma-separated list of: 'hang' and 'abort'. A 'hang' means that a program has not made progress in a specified amount of time. An 'abort' means that a program has abnormally terminated. |
| signal | The parameter 'signal' is the signal that should be sent to the thread if the watchdog event is detected. It can be either an integer or a symbolic value representing a legal signal. In UNIX systems, for example, the signal symbols can be imported by a variety of means including using one or more of these statements: #include <signal.h> |

TABLE 1-continued pragma watch(condition_list, signal=signum | call=userfunc [,max_heartbeats=nn]
          [,heart_rate=nn] [,event_handle=variable]
          [,userlib=path_to_shared_library_containing_user_code]).

| Parameter | Comment |
|---|---|
|  | #include <sys/signal.h><br>#include <sys/iso/signal_iso.h><br>See Table 3 for a list of the signals imported by the statements above. The signals are illustrative only; and signals recognized by the data processing system 100 may be used. |
| call | The parameter 'call' identifies a function to be called if an event is detected. The function will receive as its argument the event handle of the event that was detected. The parameters call and signal are, in one embodiment, mutually exclusive. |
| max_heartbeats | The parameter 'max_heartbeats' specifies the number of heartbeats that the program can send before the watchdog will conclude that the thread or program is hung (e.g., in an infinite loop). If max_heartbeats is not specified then there is no limit. |
| heart_rate | The parameter 'heart_rate' specifies the rate at which heartbeats must arrive. If two heartbeats are separated in time by more than heart_rate (measured, e.g., in seconds or milliseconds) then the watchdog may conclude that the thread is hung. If heart_rate is not specified then there is no minimum heart rate. If condition_list includes "hung" then max_heartbeats, heart_rate, or both may be specified. |
| event_handle | The parameter 'event_handle' specifies a variable of type wd_event_handle_t into which the event handle will be written when the watchdog is initialized. |
| userlib | The parameter 'userlib' provides the file system path to a function library that includes the function specified by the 'call' parameter. |

TABLE 3

| Signal | Comment |
|---|---|
| #define SIGHUP 1 | /* hangup */ |
| #define SIGINT 2 | /* interrupt (rubout) */ |
| #define SIGQUIT 3 | /* quit (ASCII FS) */ |
| #define SIGILL 4 | /* illegal instruction (not reset when caught) */ |
| #define SIGTRAP 5 | /* trace trap (not reset when caught) */ |
| #define SIGIOT 6 | /* IOT instruction */ |
| #define SIGABRT 6 | /* used by abort, replace SIGIOT in the future */ |
| #define SIGEMT 7 | /* EMT instruction */ |
| #define SIGFPE 8 | /* floating point exception */ |
| #define SIGKILL 9 | /* kill (cannot be caught or ignored) */ |
| #define SIGBUS 10 | /* bus error */ |
| #define SIGSEGV 11 | /* segmentation violation */ |
| #define SIGSYS 12 | /* bad argument to system call */ |
| #define SIGPIPE 13 | /* write on a pipe with no one to read it */ |
| #define SIGALRM 14 | /* alarm clock */ |
| #define SIGTERM 15 | /* software termination signal from kill */ |
| #define SIGUSR1 16 | /* user defined signal 1 */ |
| #define SIGUSR2 17 | /* user defined signal 2 */ |
| #define SIGCLD 18 | /* child status change */ |
| #define SIGCHLD 18 | /* child status change alias (POSIX) */ |
| #define SIGPWR 19 | /* power-fail restart */ |
| #define SIGWINCH 20 | /* window size change */ |
| #define SIGURG 21 | /* urgent socket condition */ |
| #define SIGPOLL 22 | /* pollable event occured */ |
| #define SIGIO SIGPOLL | /* socket I/O possible (SIGPOLL alias) */ |
| #define SIGSTOP 23 | /* stop (cannot be caught or ignored) */ |
| #define SIGTSTP 24 | /* user stop requested from tty */ |
| #define SIGCONT 25 | /* stopped process has been continued */ |
| #define SIGTTIN 26 | /* background tty read attempted */ |
| #define SIGTTOU 27 | /* background tty write attempted */ |
| #define SIGVTALRM 28 | /* virtual timer expired */ |
| #define SIGPROF 29 | /* profiling timer expired */ |
| #define SIGXCPU 30 | /* exceeded cpu limit */ |
| #define SIGXFSZ 31 | /* exceeded file size limit */ |
| #define SIGWAITING 32 | /* process's lwps are blocked */ |
| #define SIGLWP 33 | /* special signal used by thread library */ |
| #define SIGFREEZE 34 | /* special signal used by CPR */ |
| #define SIGTHAW 35 | /* special signal used by CPR */ |
| #define SIGCANCEL 36 | /* thread cancellation signal used by libthread */ |
| #define SIGLOST 37 | /* resource lost (eg, record-lock lost) */ |
| #define SIGXRES 38 | /* resource control exceeded */ |

As the compiler 118 reads the source code 120, the compiler 118 encounters the watchdog specifications. The compiler 118 parses the watchdog specifications and identifies the associated code block. To that end, the compiler 118 may identify the statements that comprise a loop, or identify an opening and closing brace character that surround a non-loop code block.

For each watchdog specification, the compiler 118 forms and inserts a watchdog setup call. As shown in FIG. 2, the compiler 118 forms the watchdog setup call 210 after parsing the watchdog specification 202 and forms the watchdog setup call 212 after parsing the watchdog specification 206. Although the setup calls 210-212 (and additional calls explained below) are shown in FIG. 2 as source code statements, it is noted that the compiler 118 typically instead inserts the calls directly into the object code 124 during compilation.

As shown in FIG. 2, the watchdog setup calls 202, 212 are function calls to the wd_start_watchdog function in the watchdog support library 140. The parameter and return type characteristics of the watchdog setup calls 202, 212 are shown below in Table 4.

TABLE 4

Parameters for wd_start_watchdog( )

| Parameter | Explanation |
|---|---|
| wd_watchdog_t *watchdog | Pointer to a watchdog specifier structure (type wd_watchdog_t) |
| Return type: wd_handle_t | A unique identifier for the code block being watched by the watchdogs. |

The compiler 118 parses the watchdog specifier 202 to generate parameters for the watchdog specifier structure passed to wd_start_watchdog( ). The elements of the watchdog specifier structure are shown below in Table 5:

TABLE 5

Parameters for the watchdog specifier structure

| Parameter | Explanation |
|---|---|
| wd_handle_t event_handle | A unique identifier generated by the watchdog setup call and represented, for example, by an integer |
| wd_threat_type_t threat_type | A threat type represented, for example, by an integer. The threat type identifies whether the threat posed by the code block is a failure to progress threat (e.g., a hang) or a failure that will abort the program. |
| wd_handler handler | A pointer to a function that should be called when the watchdog detects a problem. |
| void *handler_param | An opaque parameter passed to the handler function for handling the watchdog event. |
| int signal | An integer that represents the signal number to raise when a watchdog event occurs. |
| wd_heartbeat_interval heartbeat_interval | For a hang threat type, heartbeat_interval specifies how often (for example, in microseconds) to expect a message or signal from a watchdog progress call. |
| float heartbeat_scale | This parameter specifies the units on the heartbeat_interval parameter, in seconds. |
| wd_max_heartbeats max_heartbeats | For a threat type that is a hang, max_heartbeats specifies how many heartbeats would indicate that the program has stopped making progress (e.g., is in an infinite loop). |
| char *user_func_lib | A pointer to a string that holds the pathname to a library that contains the function specified by the 'handler' parameter. |

In particular, the watchdog specifier 202 parameters map to the watchdog specifier structure in the following manner. The threat_type is obtained by determining whether 'hang' or 'abort' or both have been specified in the watchdog specification. The handler is specified by the watchdog specification by the 'call' parameter (and may be set to NULL if the signal parameter is non-zero), while the pointer to the handler parameters may be a pointer to any data or function that the handler may use while reacting to the watchdog event. The handler may be, for example, dynamically loadable code created by the user to handle aborts. As examples, the handler may be stored in a shared library on a UNIX machine or in a dynamically linked library (DLL) on a Microsoft Windows machine. The signal parameter is the signal number to be sent to the thread if the watchdog sees a problem, and may be set to zero if the thread_type is 'abort' or the 'handler' is not NULL.

The parameters heartbeat_interval, max_heartbeats, and the pointer to the user function library are obtained directly from the watchdog specification. The heartbeat scale specifies the units on the heartbeat_interval in seconds. For example, heartbeat scale may be 0.001, or 1 millisecond. Then, a heartbeat_interval of 20 translates into an expected heartbeat every 20*0.001 seconds, or 20 milliseconds. The heartbeat scale may be, for example, a configurable parameter associated with the compiler 118, or may be set forth in the watchdog specification. For example, the compiler 118 may interpret a heart_rate that is greater than zero as a multiplier for the heartbeat scale (e.g., as noted above 20 (the heart_rate) times 0.001 (the heartbeat scale)). A heart_rate less than zero may then be interpreted as including the heartbeat scale. For example, a heart_rate of 0.002 may specify a maximum time difference between watchdog updates of 2 milliseconds.

The watchdog status table 138 may be, for example, a global table that holds, for each watchdog, a counter indicating the number of events for which the associated watchdog is watching and a thread or process id of the watchdog thread or program. The watchdog setup call maintains the watchdog status table 138.

As noted above, there are several actions that a watchdog can take when the event occurs for which it is watching. The actions include, as examples, calling a user-defined function and sending a signal to the thread in which the event occurs. In either case, the watchdog stops watching for that particular event and decrements the event count in the global table 138. If the event count goes to zero, the watchdog may (but is not required to) terminate itself.

For watchdogs that are supposed to call a user-defined function, there is generally one watchdog per watched thread. When an event occurs, the watchdog calls the user-defined function. If the user-defined function returns, the watchdog generally terminates itself (but not the process in which it is running) by terminating the thread in which it is running. The watchdog stores information about each monitored event in its parameter table (e.g., the parameter table 144) as shown in Table 6:

TABLE 6

Parameters stored in the watchdog parameter table

| | |
|---|---|
| a user handler specifier that identifies a user defined function to call when a watchdog event occurs | maximum number of heartbeats before assuming that a thread is hung |
| number of heartbeats recorded so far | maximum heartbeat interval |
| time of last contact | event handle |

Each time a program reports progress to the watchdog, it increments the number of heartbeats recorded and then compares that number to the maximum number that would indicate a hung thread before deciding whether to continue. If a watchdog does not get a heartbeat within the time interval specified by the maximum heartbeat interval, then it assumes that the thread is hung. The event handle entry provides a handle that the watchdog uses to distinguish between multiple events for which it is watching.

Watchdogs that have been specified to send a signal can watch many threads at once. Those watchdogs keep the following information for each event for which they are watching in their parameter table as shown in Table 7:

TABLE 7

Parameters stored in the watchdog parameter table

| | |
|---|---|
| signal to send | maximum number of heartbeats before assuming that the thread is hung |
| number of heartbeats recorded so far | maximum heartbeat interval |
| time of last contact | event handle |
| thread ID of the thread to watch | |

The thread ID allows the watchdog to identify and send the signal to the correct thread.

The sets of entries in the parameter tables may be stored in a linked list, hash table, or any other data structure that allows read/write access to multiple records.

After setting the parameters in the watchdog status table 138, the watchdog setup call 210 initiates execution of a watchdog to watch the code block (and passes to the watchdog the parameters for its parameter table). The type of watchdog initiated depends in part of the threat scope. When the threat scope is thread-level (i.e., failure of the code block would cause failure of the thread including the code block), then the watchdog setup call 210 initiates execution of the watchdog thread 130 to monitor the code block. On the other hand, when the threat scope is program-level (i.e., failure of the code block would cause failure of the programs as a whole), then the watchdog setup call 210 initiates execution of the watchdog program 132 to monitor the program that includes the code block.

It may also be the case that the threat scope is machine level (i.e., failure of the code block would cause the data processing system 100 to crash). In that case, the watchdog setup call 210 initiates execution of the watchdog program 134 on the separate data processing system 136. To do so, the watchdog setup call 210 may, as examples, send a message to or invoke a remote procedure call on the data processing system 136. The watchdog program 134 then monitors the data processing system 100 to determine is it is continuing to function. For example, watchdog progress calls, for a machine level threat scope, may send messages generated by watchdog progress and completion calls over the network to the data processing system 136 and the watchdog program 134 so that the watchdog program 134 receives a notification that the program is functioning correctly.

Each watchdog, as explained above, determines its operating parameters from the watchdog status table 138. A watchdog that checks for progress thus expects to receive heartbeat indicators at least as frequently as given by the heartbeat_interval parameter, and no more heartbeats than given by the max_heartbeats parameter. If either condition is violated (e.g., the maximum number of heartbeats is exceeded), then the watchdog initiates execution of the watchdog handler and passes a pointer to the handler parameters to the handler.

The watchdog handler may, as examples, terminate the thread or program, generate a report or display that identifies the error, reboot a remote machine, store debugging information in a log file, and the like.

Note that the watchdog setup call 210 returns an identification value to the calling program that identifies the watchdog configured to watch the code block. As shown in FIG. 2, the variable event_handle stores the value. Subsequent calls to watchdog functions generally include the identification value as a mechanism for identifying a specific watchdog.

The watchdog progress call 214 provides a mechanism for reporting a program status to a watchdog. The program status, for example, may indicate that the program is continuing to execute instructions. In that regard, the watchdog progress call 214 provides a periodic heartbeat indicator to the watchdog identified by the event_handle parameter. Note that if the pointer assignment statement or function call do not execute properly, it is unlikely that the loop will return to the watchdog progress call 214. Thus, after the heartbeat interval expires, the watchdog will invoke the watchdog handler to perform some remedial action. On the other hand, for example, if the pointers are circularly linked such that the loop would execute indefinitely, then the watchdog will receive more than the maximum number of heartbeats. Similarly, the watchdog will invoke the watchdog handler to perform some remedial action.

With regard to the code block 204, the compiler 118 inserts the watchdog progress call 214 into the code block 204 after the compiler 118 has identified the bounds of the loop for the code block 204. The watchdog progress call 214 may be inserted before or after any statement in the loop. The compiler 118, however, generally inserts the watchdog progress call 214 at the top of the loop (as shown in FIG. 2). Note that for a non-loop code block (e.g., the code block 208), the compiler 118 may insert watchdog progress calls 218 before or after one or more of the statements that comprise the code block 208.

FIG. 2 also shows a watchdog completion calls 216 and 220. The watchdog completion call 216, for example, informs the watchdog identified by the event_handle parameter that the code block 204 has finished executing. In response, the number of events for which the watchdog is watching is decremented in the status table 138.

Table 8, below, provides a summary of the watchdog functions available in the watchdog library 140.

TABLE 8

Watchdog Library

| Function | Explanation |
|---|---|
| wd_event_handle_t wd_start_watchdog(wd_watchdog_t *watchdog) | Initiate execution of the watchdogs to check for problems as specified in the fields on each watchdog specifier structure. |
| int wd_done(wd_handle_t event) | Informs the watchdogs watching for a particular event to stop watching. |
| int wd_report_progress(wd_handle_t event) | Send a heartbeat for a particular failure-to-progress event. |
| wd_time_t wd_get_time_limits( wd_handlt_t event) | Get the time limits for a particular failure-to-progress event. |
| int wd_set_time(wd_handlt_t event) | Set or reset the time limits for a particular failure-to-progress event. |

Table 9 shows, for one implementation, the underlying data types for the data types discussed above.

TABLE 9

Data Types

| Type | Underlying Type |
|---|---|
| wd_event_handle_t | long long |
| wd_threat_type_t | long long |
| wd_threat_scope_t | int |

TABLE 9-continued

Data Types

| Type | Underlying Type |
|---|---|
| wd_handler | pointer to a function that accepts a void *parameter |
| wd_heartbeat_interval | int |
| wd_max_heartbeats | long long |
| wd_time_t | a structure:<br>wd_time_t<br>{<br>  wd_heartbeat_interval heartbeat_interval;<br>  float heartbeat_scale;<br>  long long max_heartbeats;<br>} |
| wd_watchdog_t | pointer to a watchdog specifier structure |

Figure 3:
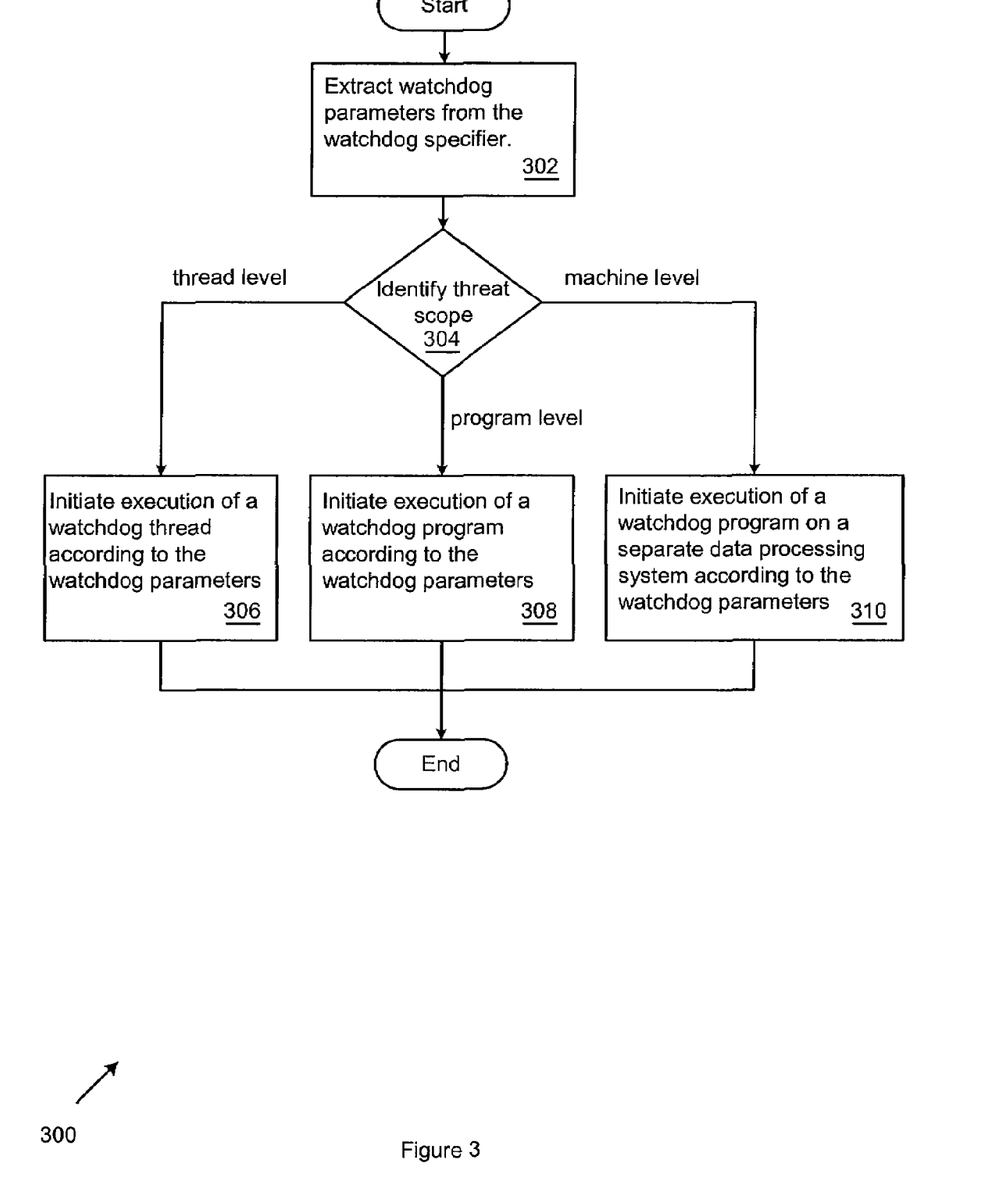
FIG. 3 depicts a flow diagram of the steps taken by a compiler running in the data processing system shown in FIG. 1 to add watchdog support to source code stored in the memory of the data processing system of FIG. 1.

Turning next to FIG. 3, that figure shows a flow diagram 300 of the steps taken by the wd_start_watchdog( ) function (the watchdog setup call) provided by the watchdog library 140. The watchdog setup call extracts the watchdog parameters from the watchdog specifier (Step 302). The compiler determines the threat scope (Step 304). Depending on the threat scope, the watchdog setup call may initiate execution of a watchdog thread (Step 306), a watchdog program (Step 308), or a watchdog program on a separate data processing system (Step 310).

In one embodiment, there will be one watchdog thread watching other threads. In other words, all threads that ask to be watched will be watched from the same thread. When a thread specifies its threat, the watchdog thread adds that threat and thread information noted above to its watchdog parameter table. Note that, in general, watchdog threads will be watching for hangs, because aborts will kill an entire process, including the watchdog thread.

As explained above, the watchdog specification for a thread with a "hang" threat typically sets forth a heartbeat interval and a maximum number of heartbeats. The heartbeat interval is the maximum amount of time that the thread can go without issuing a heartbeat; if the watchdog does not hear a heartbeat within that time, the watchdog assumes that the thread is hung. If the thread does not want to issue heartbeats (i.e., the thread simply wants to give itself a certain amount of time to accomplish a task), the thread may set the maximum number of heartbeats to 1 and set the heartbeat interval to the amount of time the thread needs to complete its task. If the watchdog does not receive a heartbeat from the thread within that interval, the watchdog assumes that the thread is hung.

The watchdog uses the heartbeat interval to determine when to wake up and check for problems. Ordinarily, the watchdog is asleep. If the watchdog is supposed to watch for a heartbeat from a particular thread every 10 time units, then the watchdog sets an alarm for itself to go off in 10 time units and goes to sleep. If the thread reports a heartbeat then the watchdog resets the alarm for another 10 time units.

If the watchdog thread is watching multiple threads then the watchdog will set its alarm so that it wakes up in time to check for each expected heartbeat. As an example, if the watchdog thread is supposed to receive a heartbeat from thread A every 10 time units and thread B every 7 time units then the watchdog thread begins by setting the alarm for 7 time units and goes to sleep. Table 10 below shows an example of how events progress thereafter.

TABLE 10

| Time | Event | Comment |
|---|---|---|
| 0 | Thread A starts | Set an alarm to wake up in 10 units (t = 10). |
| 2 | Thread B starts | Set an alarm to wake up in 7 units (t = 9). |
| 6 | Heartbeat A | Set an alarm to wake up in 3 units (t = 9) to check on B; next check for A is at time 6 (now) plus 10 (heartbeat interval), or t = 16. |
| 8 | Hearbeat B | Set an alarm to wake up in 7 units (t = 15); next check for B is 8 (now) plus 7 (hearbeat) equals t = 15. |
| 15 | Wakeup due to alarm set at time 8 | No heartbeat from B since time 8. Since more than time than the heartbeat_interval has passed, the watchdog thread presumes that thread B is hung. |

Assuming that the action for thread B was to send a signal then the watchdog thread will send a signal to thread B. As an example, a watchdog thread running on a system that supports Posix threads can use pthread_kill to send the signal. If the action for B was to call a user-defined subroutine then the watchdog thread creates a thread that runs the user subroutine using, for example, pthread_create on a system that supports Posix threads.

In either event, information about thread B is removed from the watchdog parameter table and the watchdog thread stops watching thread B. The next check on thread A (in the example above) is at t=16. Thus, the watchdog thread sets the alarm for t=16 and goes back to sleep.

Figure 4:
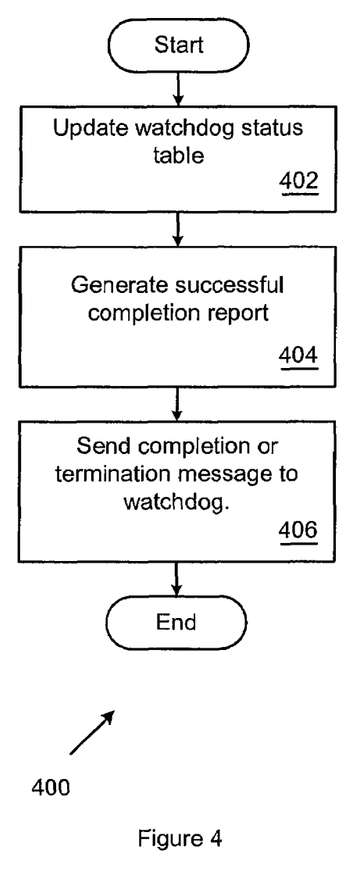
FIG. 4 depicts a flow diagram of the steps taken by a watchdog completion function running in the memory of the data processing system shown in FIG. 1 when a watchdog is no longer needed to monitor a code block.

FIG. 4 shows a flow diagram 400 of the steps taken by the wd_done( ) function. The function updates the watchdog status table 138 to reflect completion of the code block being watched (Step 402). To that end, as examples, the function may remove the watchdog entry for the code block or set a 'completed' flag in the watchdog table 138. The function may also generate an indication (e.g., a dialogue box, log entry, or the like) that the code block has successfully completed (Step 404). In addition, the function may also send a completion or termination message to the watchdog thread or program that is watching the code block (Step 406).

Figure 5:
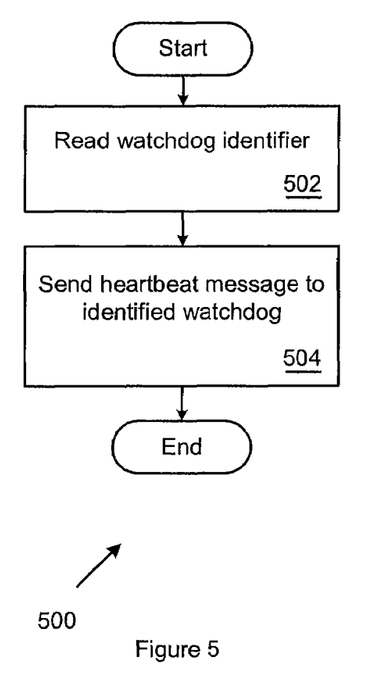
FIG. 5 depicts a flow diagram of a watchdog reporting call that informs a watchdog running in the data processing system shown in FIG. 1 that a program has reached a specified point in its execution.

FIG. 5 shows a flow diagram 500 of the steps taken by the wd_report_progress( ) function. The function is used as a reporting call to inform the watchdog that execution of code in the code block has reached the point where the wd_report_ progress( ) function was inserted. The reporting call thus functions as a heartbeat to the watchdog. The function determines to which watchdog to send the heartbeat by checking the watchdog identifier passed to the reporting call (Step 502). The function then sends a heartbeat indicator to the watchdog (Step 504). As examples, the function may send a message or signal to the watchdog, set or reset a flag in the watchdog status table 138, or the like.

Figure 6:
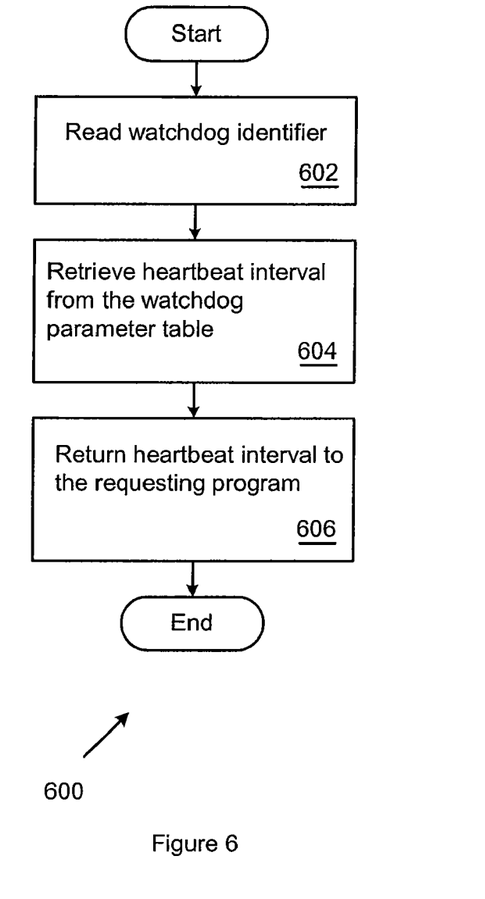
FIG. 6 depicts a flow diagram of a watchdog status function running in the data processing system shown in FIG. 1 for determining heartbeat timing parameters for a specified watchdog.

FIG. 6 shows a flow diagram 600 of the steps taken by the wd_get_time_limits( ) function. The function reads the watchdog identifier parameter (Step 602) and retrieves the corresponding heartbeat interval from the watchdog status table 138 (Step 604). The heartbeat interval is then returned to the calling program (Step 606).

Figure 7:
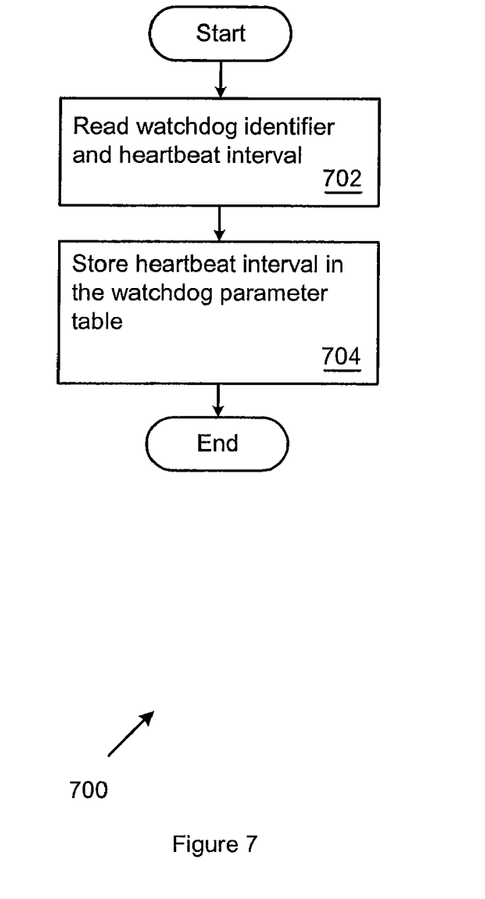
FIG. 7 depicts a flow diagram of a watchdog status function running in the data processing system shown in FIG. 1 for setting heartbeat timing parameters for a specified watchdog.

FIG. 7 shows a flow diagram 700 of the steps taken by the wd_set_time_limits( ) function. The function reads the watchdog identifier parameter and new heartbeat interval (Step 702) and sets the corresponding heartbeat interval from the watchdog status table 138 (Step 704).

Figure 8:
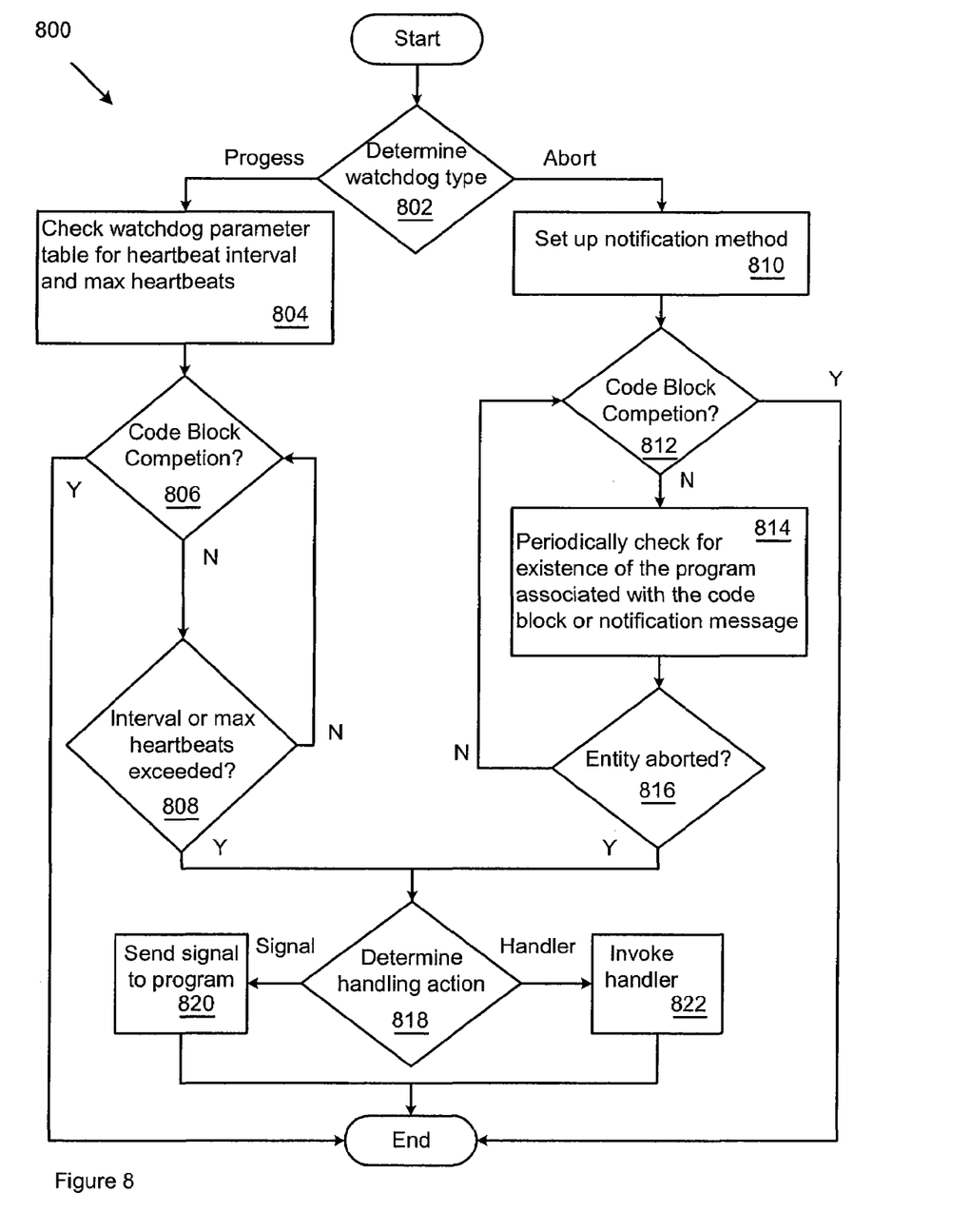
FIG. 8 depicts a flow diagram of the steps taken by a watchdog when monitoring execution of a code block running in the data processing system shown in FIG. 1.

FIG. 8 shows a flow diagram 800 of the steps taken by a watchdog program or thread. The watchdog first checks the watchdog parameter table to determine which type watchdog event for which it is watching (Step 802).

A progress watchdog determines (using the heartbeat parameters) when a program or thread is taking too long to compute a result or reach a specified execution point (for example, the program may be in an infinite loop) For that reason, the progress watchdog may first check the watchdog parameter table to ascertain the heartbeat interval and maximum number of heartbeats, as well as a maximum completion time limit (Step 804). If the code block that is being watched completes, then the watchdog generally terminates (Step 806). The watchdog may ascertain completion of the code block by receiving a signal or message (arising from the use of the wd_complete( ) function), or by checking for a flag in the watchdog parameter table 138 to be set or reset.

If the code block has not completed, the progress watchdog determines whether the code block is making sufficient timely progress by checking to see if the code block has exceeded a specified time limit for completion, whether the code block exceeds the number of heartbeats to complete a particular operation, whether the heartbeat interval is greater than that specified for the code block, or whether the code block has not passed a particular checkpoint within a specified time limit (Step 808). If so, the watchdog determines the action for handling the watchdog event (see below).

An abort watchdog determines when a program or thread has permanently terminated processing in a way that prevents the program or thread from continuing. To that end, the abort watchdog may set up a notification method (e.g., code to accept and process messages or signals) with which the operating system may communicate to send a notification that a program or thread has aborted, terminated, or crashed (Step 810). In a manner similar to that of the progress watchdog, the abort watchdog checks to see if the code block has completed (Step 812), and if so, generally terminates.

In addition or in the alternative to the notification method, the abort watchdog may periodically test for the existence of the computational entity (e.g., the program or thread) that is executing the code block (Step 814). The abort watchdog may check for the existence of the program or thread, for example, by checking the processes that are running in the data processing system 100. If the entity is no longer running (checked at step 816), then the abort watchdog determines the action for handling the watchdog event (see below).

As noted above, the watchdog program may take remedial action by sending a signal to the program being watched (when the program has not aborted), or by invoking a handler. To that end, the watchdog program determines which action to take (Step 818). Generally, the remedial action is set forth in the watchdog specification. When the remedial action is to send a signal, then the watchdog program initiates a call to send the signal set forth in the watchdog specification to the program (Step 820). If the remedial action is to invoke a handler, then the watchdog program initiates execution of the handler identified in the watchdog specification (Step 822).

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

What is claimed is:

1. A computer-readable memory device encoded with a data structure created by a watchdog program that is encoded in the computer-readable memory device and that is run by a processor in a data processing system, the data structure comprising:

a maximum heartbeat specifier; and a program identifier;

wherein the data structure is accessed by the watchdog program to detect when a program execution abnormality has occurred by determining when the maximum heartbeat specifier has been exceeded for a program running in the data processing system.

2. The computer-readable memory device according to claim 1, wherein the data structure further comprises a signal specifier, and wherein the watchdog program sends a signal specified by the signal specifier to a program identified by the program identifier, when the program execution abnormality has been detected.

3. A computer-readable memory device encoded with a data structure created by a watchdog program that is encoded in the computer-readable memory device and that is run by a processor in a data processing system, the data structure comprising:

a maximum heartbeat specifier; and a user handler specifier;

wherein the data structure is accessed by the watchdog program to detect when a program execution abnormality has occurred by determining when the maximum heartbeat specifier has been exceeded for a program running in the data processing system.

4. The computer-readable memory device according to claim 3, wherein the watchdog program initiates execution of a handler identified by the user handler specifier, when the program execution abnormality has been detected.

* * * * *